US008640433B2

(12) United States Patent
Tilley

(10) Patent No.: US 8,640,433 B2
(45) Date of Patent: Feb. 4, 2014

(54) PACKAGING APPARATUS INCLUDING ROTARY JAW DEVICE AND METHOD OF MAKING PACKAGES

(75) Inventor: Mark Tilley, Great Glen (GB)

(73) Assignee: Frito-Lay Trading Company GmbH, Berne (CH)

( * ) Notice: Subject to any disclaimer, the term of this patent is extended or adjusted under 35 U.S.C. 154(b) by 0 days.

(21) Appl. No.: 13/816,617

(22) PCT Filed: Aug. 12, 2011

(86) PCT No.: PCT/EP2011/063924
§ 371 (c)(1),
(2), (4) Date: Apr. 22, 2013

(87) PCT Pub. No.: WO2012/020118
PCT Pub. Date: Feb. 16, 2012

(65) Prior Publication Data
US 2013/0210595 A1     Aug. 15, 2013

(30) Foreign Application Priority Data

Aug. 12, 2010  (GB) .................................. 1013544.0

(51) Int. Cl.
*B65B 51/10*     (2006.01)
(52) U.S. Cl.
USPC ............................... 53/477; 53/548; 53/371.4
(58) Field of Classification Search
USPC ........ 53/477, 548, 552, 371.4, 374.4; 83/300, 83/337, 678, 673; 156/515, 553, 555, 581
See application file for complete search history.

(56) References Cited

U.S. PATENT DOCUMENTS

| | | | | | |
|---|---|---|---|---|---|
| 2,125,939 | A | * | 8/1938 | MacFarren | 83/341 |
| 3,380,328 | A | * | 4/1968 | Martin | 83/156 |
| 3,401,585 | A | * | 9/1968 | Schmermund | 83/341 |
| 3,528,333 | A | * | 9/1970 | Hornung | 83/341 |
| 4,034,637 | A | * | 7/1977 | Ollery | 83/341 |
| 4,102,111 | A | * | 7/1978 | Nack | 53/552 |
| 4,254,601 | A | * | 3/1981 | Prager | 53/133.8 |
| 4,630,514 | A | * | 12/1986 | Ohmori | 83/342 |
| 4,664,006 | A | * | 5/1987 | Mitchell | 83/341 |
| 4,943,341 | A | * | 7/1990 | Mattei | 156/517 |
| 5,000,069 | A | * | 3/1991 | Knobel | 83/285 |
| 5,067,302 | A | * | 11/1991 | Boeckmann | 53/374.8 |
| 5,839,343 | A | * | 11/1998 | Michalik | 83/663 |
| 6,142,048 | A | * | 11/2000 | Bradatsch et al. | 83/341 |
| 8,402,724 | B2 | * | 3/2013 | Cecil et al. | 53/451 |
| 2007/0062158 | A1 | * | 3/2007 | Boldrini et al. | 53/374.6 |

FOREIGN PATENT DOCUMENTS

| | | | |
|---|---|---|---|
| CN | 201224519 Y | 4/2009 | |
| GB | 1292484 A | 11/1972 | |
| GB | 2059337 A * | 4/1981 | ............ B29C 27/02 |
| JP | 2005280762 A | 10/2005 | |
| JP | 2008213877 A | 9/2008 | |

* cited by examiner

*Primary Examiner* — Hemant M Desai
(74) *Attorney, Agent, or Firm* — Colin P. Cahoon; Amanda K. Jenkins; Carstens & Cahoon, LLP

(57) ABSTRACT

A packaging apparatus including a rotary jaw device, the rotary jaw device comprising an elongate holder, an elongate knife mounted on and projecting outwardly from the elongate holder, the knife having an elongate cutting edge parallel to a plane of the knife, and at least one part of a heat seal device located on the elongate holder on opposed sides of the knife. A packaging method is also disclosed.

21 Claims, 4 Drawing Sheets

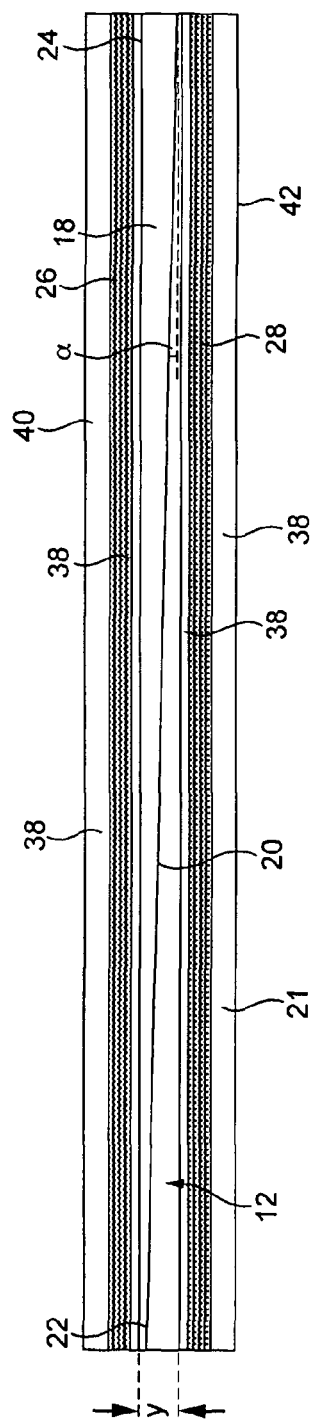
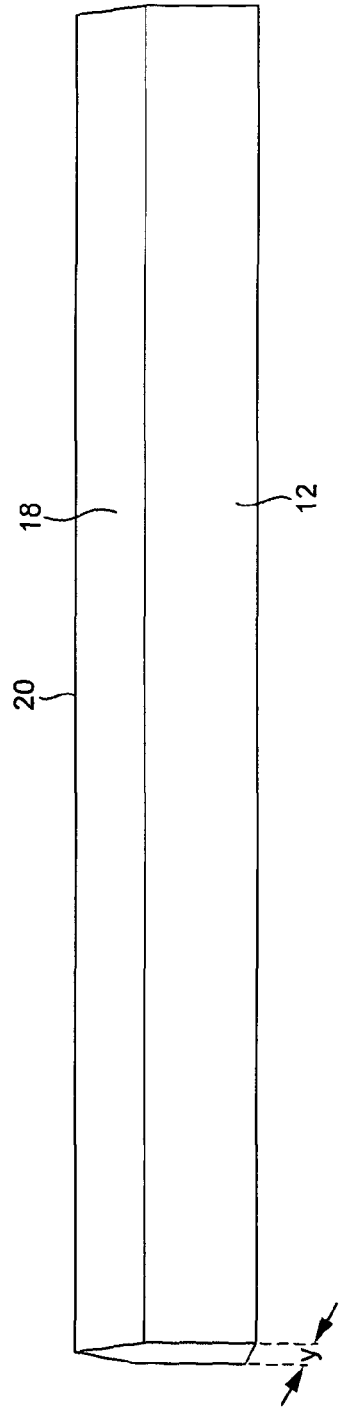
FIG. 2
(PRIOR ART)
FIG. 3
(PRIOR ART)

PACKAGING APPARATUS INCLUDING ROTARY JAW DEVICE AND METHOD OF MAKING PACKAGES

CROSS-REFERENCE TO RELATED APPLICATIONS

This application is a 371 National Stage Application claiming priority to PCT Application No. PCT/EP2011/063924 filed Aug. 12, 2011, which claims priority to Great Britain Application No. 1013544.0 filed Aug. 12, 2010, now GB Patent No. 2482713 issued Oct. 3, 2012, the technical disclosures of which are hereby incorporated by reference.

BACKGROUND OF THE INVENTION

1. Technical Field

The present invention relates to packaging apparatus including a rotary jaw device and to a method of making packages.

2. Description of Related Art

It is known to employ vertical form, fill, and seal (VFFS) packaging apparatus to produce packages, in the form of bags, pillow packs or pouches of products, such as snack foods. A tubular film, having been formed from a roll of packaging film of heat sealable plastic material which has been longitudinally sealed, is fed intermittently through a jaw device. The film forms a flattened tube at the jaw device. The jaw device forms a pair of vertically spaced hermetic heat seals extending transversely across the tube, the seals being located between vertically adjacent packages. The jaw device also cuts through a middle portion, located between the hermetic seals, extending across the tube which separates a lower sealed package containing the packaged product from an upper unsealed package.

In this way, a lower hermetic seal forms the upper seal of the lower package, and an upper hermetic seal forms the lower seal of the upper package. The upper package is then filled with product, the tube is advanced downwardly through the jaw device, and then the cycle is repeated when the upper edge of the upper package, and the lower edge of the following package, is disposed between the jaws of the jaw device.

There are several known principles of operation of such jaws of a vertical, form, fill, and seal (VFFS) packaging apparatus. One class of jaw devices utilises a continuous rotary jaw motion, which is illustrated with reference to FIGS. 1 and 2.

Referring to FIG. 1, in such a jaw device 10, a knife 12 is disposed on one side of the flattened, longitudinally sealed tube 14, and a hardened reaction pad or anvil 16 is disposed on the opposite side of the tube 14, with the tube located between the knife 12 and anvil 16. The knife 12 is urged under pressure against the anvil 16 to cut through the film of the tube 14, trapped between the knife blade 18 and the anvil 16, by a pressured crush-cutting action.

The knife 12 and the anvil 16 both rotate in phase and in opposite rotational directions as shown by the arrows in FIG. 1 so that the knife 12 and the anvil 16 engage so as to cut packaging film material, in the form of a flattened tube as described below, centrally located therebetween.

The knife 12 is rotated about an axis X orthogonal to the longitudinal direction L of the tube 14 and parallel to the surface of the anvil 16 and the cutting edge 20 of the blade 18. Although not illustrated, plural knives 12 may be mounted about a common shaft disposed along axis X and mutually angularly separated, so that for each cycle of rotation of the common shaft, plural cuts are made by respective knives 12. Plural anvils 16 would be correspondingly provided.

As also shown in FIGS. 2 and 3, the elongate knife 12 is mounted in an elongate holder 21 in the form of a mounting block. For clarity of illustration, some dimensions and angles are exaggerated in FIGS. 2 and 3.

The lower portion of the knife 12 is received in an elongate recess 30 in the elongate holder 21 and securely fixed therein. The cutting action of the knife 12 is progressive, so that during the continuous rotation of the knife 12 in holder 21, initially one longitudinal end 22 of the knife 12 first contacts the anvil 16 and subsequently the contact point therebetween progresses along the cutting edge 20 of the blade 18 towards the other longitudinal end 24 of the knife 12. To achieve such progressive cutting action, as shown in FIGS. 2 and 3, the cutting edge 20 of the blade 18 is ground at an angle $\alpha$ to the plane of the knife 12. Typically, the angle $\alpha$ is 2 degrees. Accordingly, as the rotary contact progresses, the whole width of the flattened tube 14 is not cut through simultaneously, but instead point contact of the knife blade 18 transitions across the tube 14 as the rotary action progresses. The progressive cutting action is similar to that of a rotary blade of a cylinder lawnmower.

Elongate heat seal devices 26, 28 are disposed either in the anvil 16 and/or in the elongate holder 21 for the knife so that transverse hermetic seals 32, 34 are formed in the flattened tube 14 on opposite sides of the transverse cut 36 made by the knife 12. The heat seal devices 26, 28 may take a number of forms, typically transversely extending mating ridges and grooves formed in the opposed surfaces of the anvil 16 and the elongate holder 21.

As shown in FIG. 2, the knife 12 and the heat seal devices 26, 28 are mutually parallel and also parallel to the sides 40, 42 of the elongate holder 21 which is orthogonal to the longitudinal direction L. Thus, when the longitudinal direction is conventionally oriented vertically, the knife 12 and the heat seal devices 26, 28 are horizontal.

The known rotary jaw device provides an effective heat sealing and cutting mechanism, which reliably forms hermetic seals at the opposite ends of a package and with adjacent packages being reliably separated by the action of the knife.

However, there is an increasing need for product manufacturers to reduce the amount of packaging material associated with their products, and in particular not only to reduce packaging costs but also to reduce the carbon footprint, expressed in tonnes of carbon dioxide emissions, of the packaging material and/or the packaging operation.

The known rotary jaw device forms hermetic seals which are rather wide, in the longitudinal direction of the tube, and also there is material wastage between adjacent hermetic seals, because a portion of the film material of the tube which is cut through by the rotary cutting action of the knife must be provided between the adjacent hermetic seals.

Accordingly, there is a need in the art for a rotary jaw device for a packaging apparatus, and to a method of making packages, which can permit the amount of packaging material to be reduced, together with the associated packaging costs and carbon footprint, i.e. carbon dioxide emissions, while still achieving effective hermetic seals at the opposite ends of a package.

SUMMARY OF THE INVENTION

The present invention aims at least partially to meet this need.

The present invention accordingly provides a packaging apparatus including a rotary jaw device, the rotary jaw device comprising an elongate holder, an elongate planar knife mounted on and projecting outwardly from the elongate holder, the knife having an elongate cutting edge parallel to the plane of the knife, and a heat seal device located on the elongate holder on opposed sides of the knife.

Optionally, the holder is mounted on a mounting support adapted to rotate about a rotational axis, the plane of the knife being inclined to the rotational axis.

Typically, the cutting edge extends along a centre of the knife.

In one embodiment the knife has a thickness of from 1 to 3 mm, optionally about 2 mm.

Preferably, the heat seal device comprises an elongate pressure strip projecting outwardly from the elongate holder, there being two pressure strips, each extending along a respective side of the knife.

The pressure strip may comprise a strip of elastic resilient material.

The rotary jaw device may further comprise an anvil mounted in opposition to the elongate holder, so that the elongate holder and the anvil comprise opposed jaws of the rotary jaw device, the anvil having a reaction surface for the cutting action of the knife.

Preferably, the knife and anvil are mutually arranged so that as the knife rotates by rotation of the elongate holder, the cutting edge of the knife progressively contacts the reaction surface with a contact point therebetween moving longitudinally along the cutting edge.

Optionally, the anvil comprises a heater for heating the reaction surface.

Typically, the rotary jaw device is adapted for forming pillow packs of film material, optionally the packs packaging snack food.

The present invention further provides a method of making packages, the method comprising the steps of: a. providing a flattened tube of packaging film; b. locating a portion of the flattened tube between a rotary jaw device and an anvil, the rotary jaw device having an elongate planar knife with an elongate cutting edge parallel to the plane of the knife; c. rotating the rotary jaw device about a rotational axis, the plane of the knife being inclined to the rotational axis; and d. cutting through the portion of the flattened tube between the rotary jaw device and a reaction surface of the anvil for the cutting action of the knife, the knife and anvil being mutually arranged so that as the knife rotates, the cutting edge of the knife progressively contacts the reaction surface with a contact point therebetween moving longitudinally along the cutting edge.

Optionally, the cutting edge extends along a centre of the knife. Typically, the knife has a thickness of from 1 to 3 mm, optionally about 2 mm.

Preferably, the rotary jaw device and the anvil include a heat seal device which simultaneously heat seals together opposed sides of the flattened tube to form an elongate transverse hermetic seal in the vicinity of each cut end of the flattened tube.

Optionally, the heat seal device comprises two elongate pressure strips, each extending along a respective side of the knife and a heated anvil. The pressure strip may comprise a strip of elastic resilient material.

Preferably, the cut edge of each package is 0.5 to 1.5 mm, typically about 1 mm, from the heat seal.

Preferably, the hermetic seal has a width of from 1 to 4 mm, optionally 1 to 2 mm.

Typically, the packages are pillow packs of film material, optionally the packs packaging snack food.

The present invention further provides a package made by the method of the invention.

BRIEF DESCRIPTION OF THE DRAWINGS

Embodiments of the present invention will now be described by way of example only with reference to the accompanying drawings, in which:

FIG. 2 is a schematic plan view of a knife assembly used in the known rotary jaw device of FIG. 1;

FIG. 3 is a schematic perspective view of the knife used in the known rotary jaw device of FIG. 1;

DETAILED DESCRIPTION OF THE INVENTION

Figure 4:
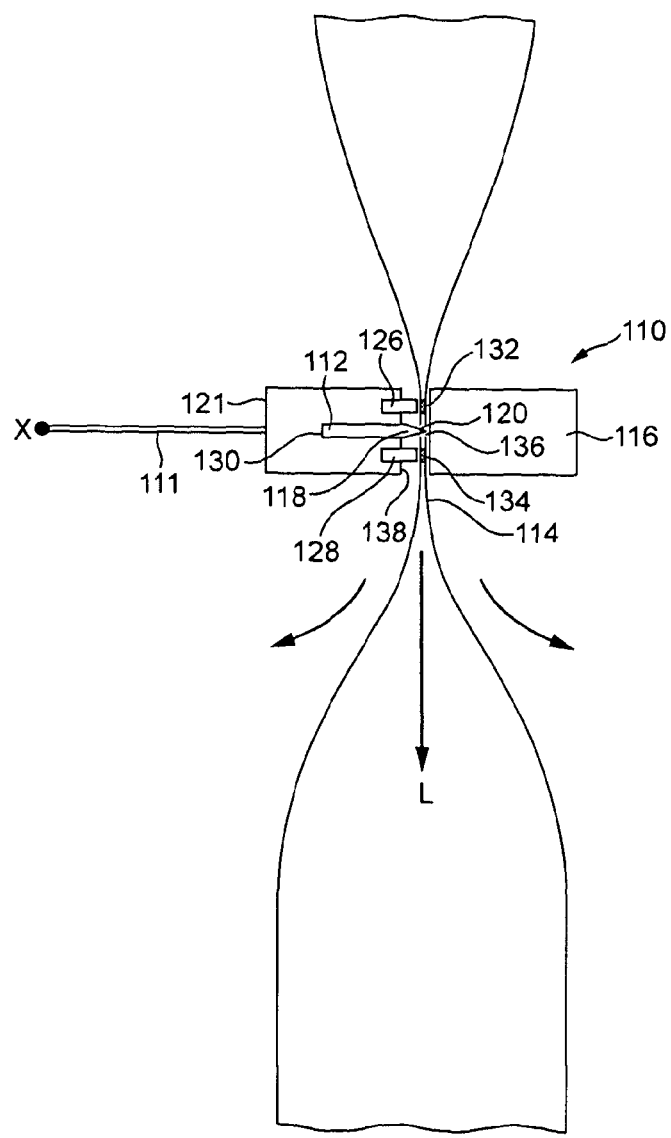
FIG. 4 is a schematic side view of a rotary jaw device for a packaging apparatus in accordance with an embodiment of the present invention.
Figure 5:
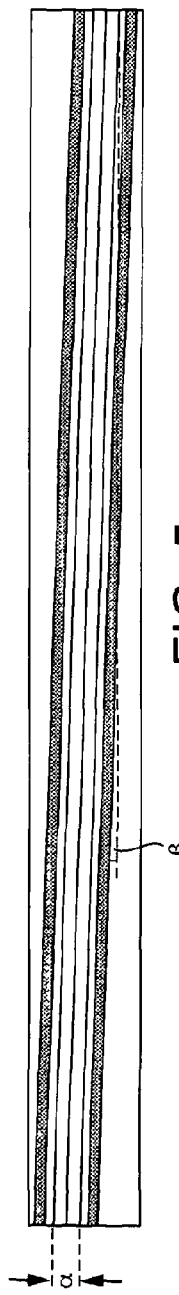
FIG. 5 is a schematic plan view of a knife assembly used in the rotary jaw device of FIG. 4.
Figure 6:
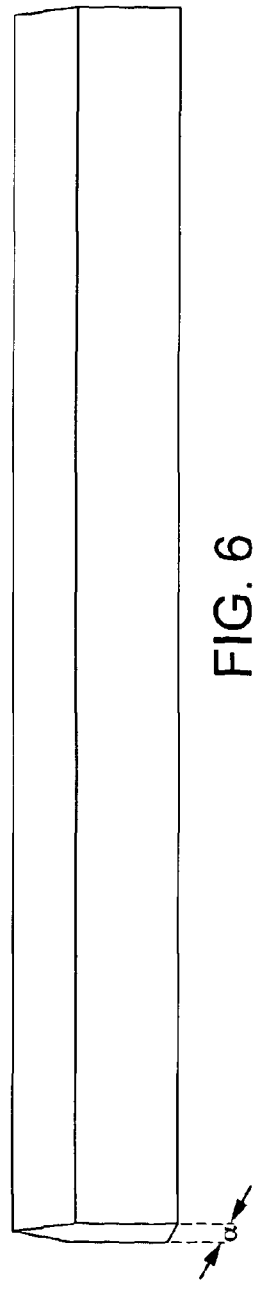
FIG. 6 is a schematic perspective view of the knife used in the rotary jaw device of FIG. 4.

FIGS. 4 to 6 illustrate a preferred embodiment of a rotary jaw device for a packaging apparatus according to the present invention, which has a continuous rotary jaw motion. The device is structured and operates in a manner similar to that of the known device of FIGS. 1 to 3 except that the structure of the mounting bock and the knife is significantly modified to achieve the desired reduction in the amount of packaging material required to form packages. The knife and the anvil both rotate in phase and in opposite rotational directions as shown by the arrows in FIG. 4 so that the knife and the anvil engage so as to cut the film material centrally located therebetween.

Figure 1:
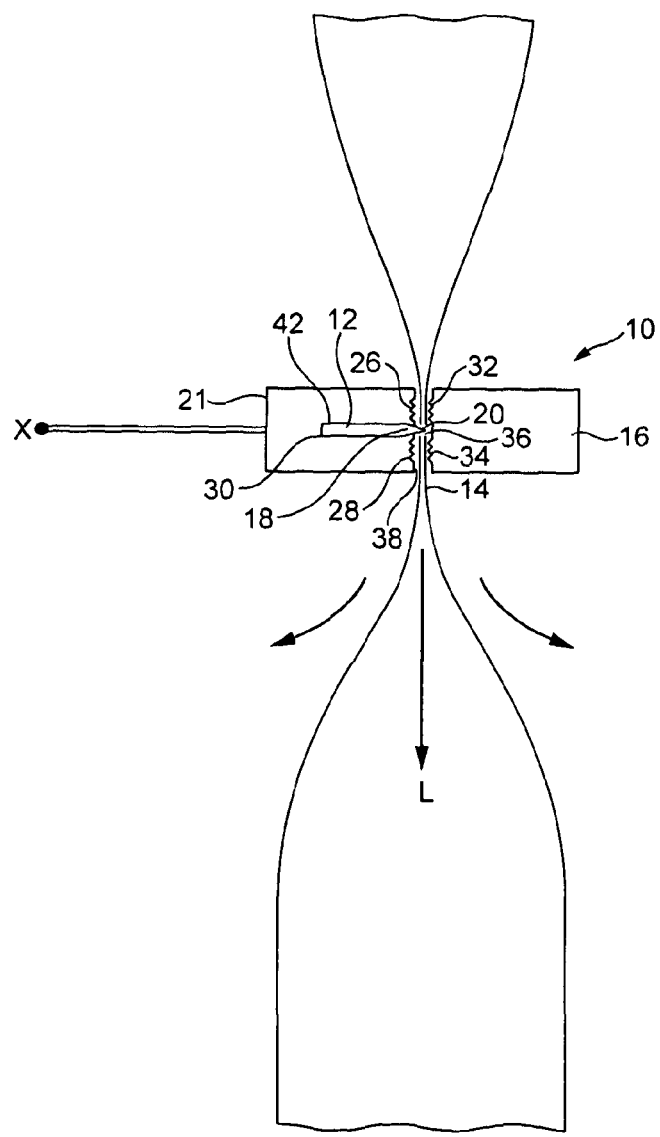
FIG. 1 is a schematic side view of known rotary jaw device for a packaging apparatus.

In the jaw device 110 of FIG. 4, a knife 112 is disposed on one side of a flattened, longitudinally sealed tube 114 of packaging film to form packages, similar to the known device of FIGS. 1 to 3. A hardened reaction pad or anvil 116 is disposed on the opposite side of the tube 114, with the tube 114 located between the knife 112 and anvil 116. The knife 112 is urged under pressure against the anvil 116 to cut through the film of the tube 114, trapped between the knife blade 118 and the anvil 116, by a pressured crush-cutting action.

The knife 112 is rotated about an axis X orthogonal to the longitudinal direction L of the tube 114 and parallel to the surface of the anvil 116 and the cutting edge 120 of the blade 118. The jaw device 110 is mounted about the axis, for example to a shaft disposed along the axis, by a mounting support 111.

As shown particularly in FIGS. 5 and 6, the elongate knife 112 is mounted in an elongate holder 121 in the form of a mounting block. For clarity of illustration, some dimensions and angles are exaggerated in FIGS. 5 and 6.

The lower portion of the knife 112 is received in an elongate recess 130 in the elongate holder 21 and securely fixed therein. The cutting action of the knife 112 is progressive, so that initially one longitudinal end 122 of the knife 112 first contacts the anvil 116 and subsequently the contact point progresses along the cutting edge 120 of the blade 118 towards the other longitudinal end 124 of the knife 112.

To achieve such progressive cutting action, as shown in FIGS. 5 and 6, the knife 112 is mounted at an angle β to the longitudinal direction of the elongate holder 121. The cutting edge 120 of the blade 118 is ground so as to be parallel to the plane of the knife 112. Typically, the angle β is 2 degrees.

Elongate heat seal devices 126, 128 are disposed either in the anvil 116 and/or in the elongate holder 121 for the knife so that transverse hermetic seals 132, 134 are formed in the flattened tube 114 on opposite sides of the transverse cut 136 made by the knife 112. In the device of the illustrated embodiment, the anvil 116 is a heated block, and elongate pressure strips 126, 128, for example of elastic and resilient material such as heat-resistant rubber, are disposed on respective opposed sides of the knife 112. The knife 112 and the pressure strips 126, 128 stand proud of the mounting surface 138 of the elongate holder 121.

The elongate pressure strips 126, 128 are parallel to the knife 112, and accordingly the elongate pressure strips 126, 128 are also mounted at an angle β to the longitudinal direction of the elongate holder 121. The knife 112 and the pressure strips 126, 128 are therefore inclined at the angle β to the longitudinal sides of the elongate holder 121 which is orthogonal to the longitudinal direction L. Thus, when the longitudinal direction is oriented vertically, knife 112 and the pressure strips 126, 128 inclined at the angle β to the horizontal.

As the rotary contact progresses, the whole width of the flattened tube 114 is not cut through simultaneously, but instead point contact of the knife blade 118 transitions across the tube 114 as the rotary action progresses. The pressure strips 126, 128 locally press the film material of the tube 114 against the heated anvil 116 to form two spaced hermetic seals 132, 134.

Typically, the width of the knife (dimension a in FIGS. 5 and 6) is from 1 to 3 mm, most typically 2 mm, and the cutting edge 120 is centrally located along the entire length of the blade 118 of the knife 112.

In contrast, in the known device of FIGS. 1 to 3, since the cutting edge 20 is inclined to the plane of the knife 12, the width of the knife 12 (dimension y in FIGS. 2 and 3) must be significantly greater, typically 5 mm, than that of the knife 112 used in the present invention in order to be able to accommodate the inclination of the cutting edge within the blade. No such inclination is present in the knife of the device of the present invention; rather, the cutting edge 120 and the plane of the knife 112 are parallel, and not only is there a reduction in knife thickness, but also the knife is easier to manufacture.

Instead of providing a parallel-mounted knife with an inclined blade as in the known device, the device of the present invention provides an inclined mounting for a knife with a parallel central blade. The elongate pressure strips 126, 128 are parallel to the knife 112 and so the entire assembly of the knife 112 and the elongate pressure strips 126, 128 on opposite sides thereof is mounted at an inclination to the longitudinal direction of the elongate holder 121.

The provision of elongate pressure strips 126, 128 of elastic resilient material which are urged against a rigid heated anvil, which has a planar surface, provides the advantage of a high strength seal of minimum width. The pressure strips 126, 128 can exert a high pressure over a small surface area, providing an enhanced heat seal as compared to providing a lower pressure seal over a greater width. Therefore a narrower heat seal can provide improved hermetic performance and durability as compared to a wider seal.

Typically, the entire width of the assembly of the knife 112 and the elongate pressure strips 126, 128, all inclined to the longitudinal direction of the elongate holder 121 is 8 mm, whereas in the known device the entire width of the assembly of the knife 12 and the heat seal devices 26, 28, all parallel to the longitudinal direction of the elongate holder 21 is 20 mm.

Figure 7:
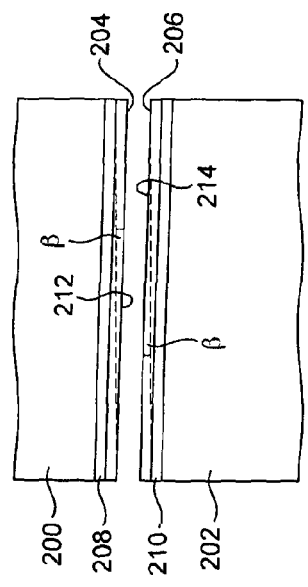
FIG. 7 is a schematic side view of a pair of packages produced by the rotary jaw device of FIG. 4.

The result of this change of structure and orientation of the knife is shown in FIG. 7.

FIG. 7 show two adjacent packages 200, 202 which have been separated by a cut formed by the knife 112. Each package 200, 202 has a cut transverse edge 204, 206 which is inclined at the angle β (exaggerated in the Figure) to the longitudinal direction of the package 200, 202. The angle is sufficiently small that it would not ordinarily be noticed by the consumer. A heat seal, forming a hermetic seal 208, 210, is provided at the end of each package 200, 202. An unsealed endmost portion 212, 214 adjacent to the cut transverse edge 204, 206 has a width corresponding to one half of the knife thickness. Therefore the unsealed endmost portion 212, 214 has a typical thickness of 0.5 to 1.5 mm, most typically 1 mm, which can be compared to a typical thickness of 2.5 mm of the corresponding unsealed endmost portion produced by the known device of FIGS. 1 to 3.

Therefore for each package produced in accordance with this embodiment of the invention there is a typical total film material saving of 3 mm in length without having any impact of the security of the heat seal.

This material saving is achieved by reducing the amount of unsealed material at the ends of the packages that has no functional purpose with respect to forming a hermetic seal.

In addition, the heat seal can be narrower than known heat seals by using the specific pressure strips against the heated anvil, providing even greater packaging material savings. Typically, the heat seal has a width of from 1 to 4 mm, optionally 1 to 2 mm.

Such a film material saving has potentially enormous impact on high volume production of products such as snack foods.

The Applicant and its related companies form part of one of the largest snack food companies in the world, and it is estimated that this packaging material saving cumulatively amounts to a global cost saving in packaging material of many tens of millions of dollars per annum, and, importantly, a saving of approximately 16 thousand tonnes of carbon dioxide production per annum. This invention therefore may yield very significant reductions in the carbon footprint of the packaging of a wide variety of products, particularly snack foods.

It will be clear to a person skilled in the art that the angle and dimensions exemplified above are merely indicative of an angle size and dimensions that may be used in accordance with the present invention, and that these parameters may be varied depending upon a number of factors, including package size, shape and dimensions.

The jaw device and method may be used to produce primary packages of a variety of products, of which snack foods are only a preferred example. The jaw device and method may also be adapted to produce secondary packages, for example multi-pack packaging.

As described above for the known device, in the device of the invention plural knives may be mounted about a common shaft disposed along the rotational axis and mutually angularly separated, so that for each cycle of rotation of the common shaft, plural cuts are made by respective knives, and corresponding plural packages are separated by the cutting action for each rotational cycle of the shaft. Plural anvils would be correspondingly provided.

In alternative embodiments, the heat seal devices may be crimping devices and/or the one or both sides of the entire assembly, namely the elongate holder and/or the anvil, may be heated. Furthermore, elongate heat seal devices may be disposed either in the anvil and/or in the elongate holder for the knife.

Other modifications to the embodiment of the invention disclosed herein will be apparent to those skilled in the art.

The invention claimed is:

1. A packaging apparatus including a rotary jaw device, the rotary jaw device comprising an elongate holder, an elongate planar knife mounted on and projecting outwardly from the elongate holder, the knife having an elongate cutting edge parallel to the plane of the knife, and a heat seal device located on the elongate holder on opposed sides of the knife, wherein the holder is mounted on a mounting support adapted to rotate about a rotational axis, the plane of the knife being inclined to the rotational axis.

2. A packaging apparatus according to claim 1 wherein the cutting edge extends along a center of the knife.

3. A packaging apparatus according to claim 2 wherein the knife has a thickness of from 1 to 3 mm.

4. A packaging apparatus according to claim 1 wherein the heat seal device comprises an elongate pressure strip projecting outwardly from the elongate holder, there being two pressure strips, each extending along a respective side of the knife.

5. A packaging apparatus according to claim 4 wherein the pressure strip comprises a strip of elastic resilient material.

6. A packaging apparatus according to claim 1 further comprising an anvil mounted in opposition to the elongate holder, so that the elongate holder and the anvil comprise opposed jaws of the rotary jaw device, the anvil having a reaction surface for the cutting action of the knife.

7. A packaging apparatus according to claim 6 wherein the knife and anvil are mutually arranged so that as the knife rotates by rotation of the elongate holder, the cutting edge of the knife progressively contacts the reaction surface with a contact point therebetween moving longitudinally along the cutting edge.

8. A packaging apparatus according to claim 6 wherein the anvil comprises a heater for heating the reaction surface.

9. A packaging apparatus according to claim 1 adapted for forming pillow packs of film material.

10. A method of making packages, the method comprising the steps of:
 a. providing a flattened tube of packaging film;
 b. locating a portion of the flattened tube between a rotary jaw device and an anvil, the rotary jaw device having an elongate planar knife with an elongate cutting edge parallel to the plane of the knife;
 c. rotating the rotary jaw device about a rotational axis, the plane of the knife being inclined to the rotational axis; and
 d. cutting through the portion of the flattened tube between the rotary jaw device and a reaction surface of the anvil for the cutting action of the knife, the knife and anvil being mutually arranged so that as the knife rotates, the cutting edge of the knife progressively contacts the reaction surface with a contact point therebetween moving longitudinally along the cutting edge.

11. A method according to claim 10 wherein the cutting edge extends along a center of the knife.

12. A method according to claim 11 wherein the knife has a thickness of from 1 to 3 mm.

13. A method according to any claim 10 wherein the rotary jaw device and the anvil include a heat seal device which simultaneously heat seals together opposed sides of the flattened tube to form an elongate transverse hermetic seal in the vicinity of each cut end of the flattened tube.

14. A method according to claim 13 wherein the heat seal device comprises two elongate pressure strips, each extending along a respective side of the knife and a heated anvil.

15. A method according to claim 14 wherein the pressure strip comprises a strip of elastic resilient material.

16. A method according to claim 13 wherein the cut edge of each package is 0.5 to 1.5 mm from the hermetic seal.

17. A method according to claim 16 wherein the cut edge of each package is about 1 mm from the hermetic seal.

18. A method according to claim 13 wherein the hermetic seal has a width of from 1 to 4 mm.

19. A method according to claim 18 wherein the hermetic seal has a width of from 1 to 2 mm.

20. A method according to claim 10 wherein the packages are pillow packs of film material.

21. A method according to claim 20 wherein the packages contain snack food.

* * * * *